United States Patent
Uruma

(10) Patent No.: US 8,610,934 B2
(45) Date of Patent: Dec. 17, 2013

(54) INFORMATION PROCESSING APPARATUS, CONTROL METHOD FOR INFORMATION PROCESSING APPARATUS, AND STORAGE MEDIUM FOR SAME

(75) Inventor: Shuichi Uruma, Kawaguchi (JP)

(73) Assignee: Canon Kabushiki Kaisha, Tokyo (JP)

(*) Notice: Subject to any disclaimer, the term of this patent is extended or adjusted under 35 U.S.C. 154(b) by 175 days.

(21) Appl. No.: 13/086,585

(22) Filed: Apr. 14, 2011

(65) Prior Publication Data
US 2011/0286035 A1    Nov. 24, 2011

(30) Foreign Application Priority Data
May 20, 2010 (JP) .................................. 2010-116139

(51) Int. Cl.
*G06F 15/00* (2006.01)

(52) U.S. Cl.
USPC ......... 358/1.15; 358/1.16; 358/403; 340/5.86

(58) Field of Classification Search
None
See application file for complete search history.

(56) References Cited

U.S. PATENT DOCUMENTS

| 7,420,696 B2* | 9/2008 | Nakagawa ................. 358/1.15 |
| 2006/0092461 A1* | 5/2006 | Kitada ...................... 358/1.15 |
| 2007/0103715 A1* | 5/2007 | Nakata ...................... 358/1.14 |
| 2008/0005176 A1* | 1/2008 | Shimizu ................... 707/104.1 |
| 2008/0100873 A1* | 5/2008 | Ohtsu ........................ 358/403 |
| 2008/0246993 A1* | 10/2008 | Murakami et al. ........... 358/1.15 |
| 2009/0119287 A1* | 5/2009 | Sato ........................... 707/5 |
| 2009/0240740 A1* | 9/2009 | Ohsawa ...................... 707/200 |
| 2010/0237993 A1* | 9/2010 | Ohsawa ...................... 340/5.86 |
| 2010/0238506 A1* | 9/2010 | Murakami .................. 358/1.16 |
| 2010/0253967 A1* | 10/2010 | Privault et al. ............... 358/1.15 |

FOREIGN PATENT DOCUMENTS

JP    2006-217350    8/2006

* cited by examiner

*Primary Examiner* — Twyler Haskins
*Assistant Examiner* — Helen Q Zong
(74) *Attorney, Agent, or Firm* — Fitzpatrick, Cella, Harper & Scinto

(57) ABSTRACT

A server executes a job related to image processing, and receives a job log including attribution information for the job from a device that formed the image to thereby form an external image URL that is recorded position information in the server for the image log related to the image. The server adds the external image URL to the job log to generate a new job log that is recorded in a storage unit, and then executes a transmission command for the image log on the device, and receives the image log from the device. Then the server records information including the new job log and the image log as log information in the storage unit.

9 Claims, 6 Drawing Sheets

FIG. 2

| No. | JOB LOG | | | IMAGE LOG |
|---|---|---|---|---|
| | ATTRIBUTE | DEVICE IMAGE URL | EXTERNAL IMAGE URL | |
| 1 | USER 1 | http://x.y.z.w/image/1 | http://X.Y.Z.W/image/1 | (IMAGE DATA 1) |
| 2 | USER 2 | http://x.y.z.w/image/2 | http://X.Y.Z.W/image/2 | (IMAGE DATA 2) |
| : | : | : | : | : |

INFORMATION PROCESSING APPARATUS, CONTROL METHOD FOR INFORMATION PROCESSING APPARATUS, AND STORAGE MEDIUM FOR SAME

BACKGROUND OF THE INVENTION

1. Field of the Invention

The present invention relates to an information processing apparatus, a method for controlling the information processing apparatus, and a storage medium for same.

2. Description of the Related Art

The widespread application of image forming apparatuses such as printers or digital multifunction peripherals has facilitated the printing, reproduction or transmission of a document by a user of the image forming apparatus. However, in recent years, problems have arisen in relation to leakage of information caused by the printing, reproduction or transmission of a confidential document by an image forming apparatus. For example, a digital multifunction peripheral uploads documents or papers that have a range of levels of confidentiality as electronic data, and transmits that electronic data onto an information communication network. However, prevention of leakage of the electronic data is important in order to improve the operational performance of the digital multifunction peripheral. Furthermore, in the event of information leakage, it is important to enable tracking after the event to identify the information that was leaked and the person leaking the information.

Japanese Patent Laid-Open No. 2006-217350 discloses an image data monitoring system in which a user attribute based on user authentication performed when a user uses the digital multifunction peripheral is assigned to document data (image data) read by the digital multifunction peripheral, and is retained on an external server. The digital multifunction peripheral in this image data monitoring system creates the assignment between the user attribute and the image data, and stores that assignment in a storage unit as a log related to the image processing. The digital multifunction peripheral then transmits the stored log to an external server at a predetermined timing.

However, when the system is configured by connection of a plurality of digital multifunction peripherals to a single external server, the system disclosed in Japanese Patent Laid-Open No. 2006-217350 may result in a concentration of the transmission processing of the log from a plurality of digital multifunction peripherals to the external server. As a result, the problem arises that the processing capacity of the external server is reduced. A method in which the digital multifunction peripheral executes transmission of the log to the external server outside of business hours, such as during the evening, has been proposed as a solution to the above problem. However, this method is premised on a configuration in which the plurality of digital multifunction peripherals are all disposed at the site (there is no time difference). Consequently, application is not possible when the digital multifunction peripherals have a worldwide distribution. Furthermore, the system disclosed in Japanese Patent Laid-Open No. 2006-217350 does not enable monitoring of the log by the external server during transmission of the log related to image processing by the digital multifunction peripheral to the external server. For example, when the digital multifunction peripheral has not transmitted a log related to image processing to the external server, even if the external server receives a search request in relation to the log, search processing of the log in response to the search request cannot be executed in a prompt manner.

SUMMARY OF THE INVENTION

The information processing apparatus according to the present invention is an information processing apparatus that manages log information for a job related to image processing. The information processing apparatus according to the present invention enables monitoring of a log related to an image formed by image processing from immediately after execution of image processing by the image forming apparatus.

According to an aspect of the present invention, an information processing apparatus is provided that is connected with an image forming apparatus through a network, and that is configured to manage log information for a job related to image processing executed by the image forming apparatus. The information processing apparatus includes a log recording unit that is configured to receive a first log including attribution information for the job through the network from the image forming apparatus that has formed the image by execution of the job, that generates first recorded position information that is the recorded position information in the information processing apparatus for a second log related to the formed image, and records the information including the first log and the first recorded position information as a third log in a predetermined storage unit, and thereafter receives the second log from the image forming apparatus by execution of a transmission command for the second log to the image forming apparatus, and records the information including the third log and the second log in the predetermined storage unit as log information.

Further features of the present invention will become apparent from the following description of embodiments with reference to the attached drawings.

BRIEF DESCRIPTION OF THE DRAWINGS

FIG. 2 illustrates an example of log information.

DESCRIPTION OF THE EMBODIMENTS

Figure 1:
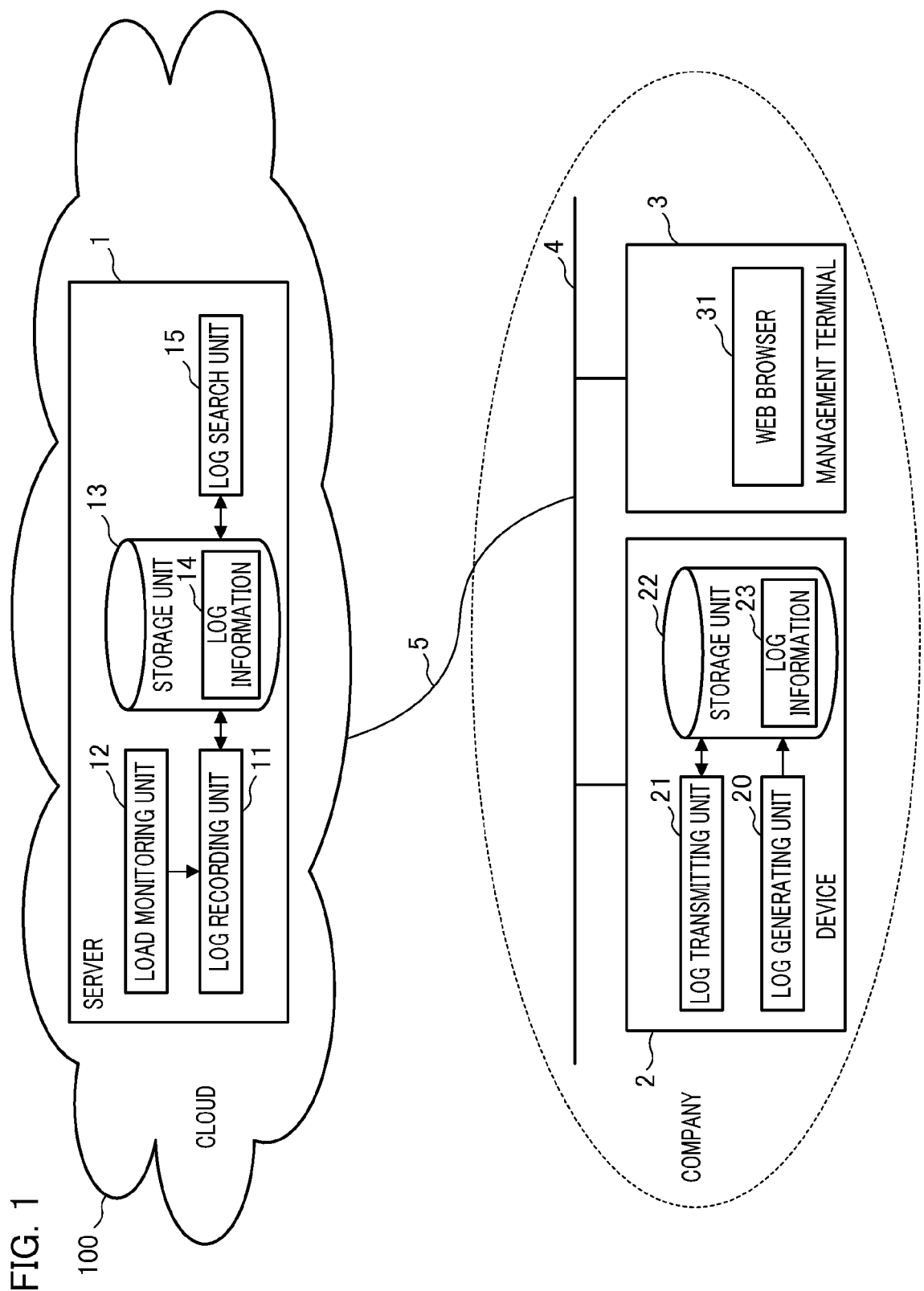
FIG. 1 illustrates an example of the configuration of a system according to a first embodiment of the present invention.

FIG. 1 illustrates an example of the configuration of a system according to a first embodiment of the present invention. The system illustrated in FIG. 1 includes a server 1, a device 2 and a management terminal 3. The server 1 is connected with the device 2 and the management terminal 3 through a network 5 such as the Internet, or the like. The device 2 and the management terminal 3 are connected with a local area network (LAN) 4.

In the present embodiment, the LAN 4 is an internal company network. The LAN 4 is separated by a firewall from the network 5. In other words, the device 2 and the management terminal 3 are disposed in a local area that is configured with limited external access. The server 1 is provided in a cloud 100. A cloud as used herein is a region in which a group of servers is disposed in a cloud computing environment. In other words, the server 1 is a server group disposed in the cloud 100. Cloud computing as used herein is a use configuration for a computer based on a network (mainly the Internet). In a cloud computing environment, a user uses computer processing as a service through a network. Access is not possible through the firewall in response to a request from a server 1 provided in the cloud 100. Therefore, the server 1 executes communication in relation to the device 2 and the management terminal 3 by responding to the request from the device 2 or the management terminal 3. The system according to the present embodiment is not limited to a configuration in which the server 1 is disposed in the cloud 100.

The server 1 is an information processing apparatus for managing log information for a job related to image processing executed by the device 2. The server 1 includes a log recording unit 11, a load monitoring unit 12, a storage unit 13, and a log search unit 15. The log recording unit 11 receives a log through the network 5 from the device 2 that has formed the image by execution of the job, and records log information 14 including the received log in the storage unit 13 that is a predetermined storage unit. More specifically, the log recording unit 11 is configured to receive a job log from the device 2 through the network 5. The job log received by the log recording unit 11 from the device 2 is a first log that includes the attribute information for the job. More specifically, the job log includes the job attribute information and the device image URL. The job attribute information can be configured as arbitrary information that is required for search of the recorded position information for the image log. The device image URL is recorded position information in the device 2 for the log (image log) related to the image formed by the device 2. The job attribute information includes a user name of the device 2 and the date and time of execution of image processing by the device 2. More specifically, the device image URL is a URL that is required when browsing an image log stored in a storage unit 22 of the device 2 from an external unit using HTTP, where HTTP is an abbreviation for HyperText Transfer Protocol, and URL is an abbreviation for Uniform Resource Locator.

The log recording unit 11 generates an external image URL as first recorded position information. The external image URL is recorded position information in the server 1 for the image log (second log) related to the image formed by the device 2. More specifically, the external image URL is the URL required when browsing the image logs stored in the storage unit 13 of the server 1 using HTTP. The log recording unit 11 generates a new job log (third log) by adding the external image URL to the job log received from the device 2, and recording the log in the storage unit 13. After the log recording unit 11 records the new job log in the storage unit, the external image URL is transmitted to the device 2. The external image URL that is transmitted to the device 2 is recorded in the storage unit 22 provided in the device 2.

The log recording unit 11 executes a transmission initiation command for the image log to the device 2 by responding to a transmission initiation permission request for the image log that is executed by the device 2 on the server 1. The transmission initiation permission request for the image log is required when seeking permission from the server 1 for the device 2 to initiate transmission of the image log. Furthermore, the transmission initiation command for the image log is a command for initiating transmission of the image log to the device 2. The log recording unit 11 executes the transmission initiation command for the image log by use, without modification, of the communication connection established when the log transmitting unit 21 of the device 2 transmits the job log to the server 1. The log recording unit 11 records the information including the new job log (third log) and the image log as log information 14 in the storage unit 13. In more detail, the log recording unit 11 deletes the device image URL from the new job log (third log) upon receipt of the image log from the device 2. The log recording unit 11 records information including the image log and the job log after deletion of the device image URL as log information in the storage unit 13.

The log recording unit 11 executes or suspends a transmission command of the image log to the device 2 in response to the load state of the server 1 that is monitored by the load monitoring unit 12. The load monitoring unit 12 monitors the load state of the server 1. The log information 14 is recorded in the storage unit 13.

The log search unit 15 searches the recorded position of the image log. More specifically, the log search unit 15 receives a search request for the image log from the management terminal 3 that is an external apparatus. Then, the log search unit 15 searches the first recorded position information (external image URL) or the second recorded position information (device image URL) recorded in the storage unit 13 based on the attribute information for the job contained in the search request. The log search unit 15 transfers the search result to the management terminal 3. In more detail, the log search unit 15 determines whether the device image URL corresponding to the attribute information for the job contained in the search request is recorded in the storage unit 13. When the device image URL corresponding to the attribute information for the job is recorded, the log search unit 15 transfers the device image URL as a search result to the management terminal 3. When the device image URL corresponding to the attribute information for the job is not recorded, the log search unit 15 transfers the external image URL corresponding to the attribute information for the job as a search result to the management terminal 3.

The device 2 is an image forming apparatus that is configured to form an image by execution of a job related to the image processing. For example, the device 2 is a multi-function peripheral (MFP), or the like. Although a plurality of other processing units is required in order for the device 2 to function as an MFP, FIG. 1 does not illustrate processing units other than the processing units required for the present embodiment. The device 2 is not limited to an MFP, and for example, may be configured by a personal computer. When the device 2 is configured by a personal computer, the device 2 generates log information when a print command is executed by a user to a printer, and records the log information in a predetermined storage unit (for example, a hard disk) in the device 2. The method of control for the information processing apparatus, and the computer program according to the present embodiment are executed by the functions of each processing unit provided in the server 1 illustrated in FIG. 1.

The device 2 includes a log generating unit 20, a log transmitting unit 21, and the storage unit 22. The log generating unit 20 generates a job log for execution of a job related to the image processing and including attribute information for the executed job, and an image log related to an image formed by execution of the job. The log generating unit 20 determines the device image URL that is the recorded position information in the device 2 for the formed image, and generates a job log including the determined device image URL and the job attribute information. The log generating unit 20 records the information including the generated image log and the job log as log information 23 in the storage unit 22.

The log transmitting unit 21 transmits the job log to the server 1 through the network 5. More specifically, the log transmitting unit 21 transmits the job log to the server 1 after confirming the communication connection with the server 1. The log transmitting unit 21 receives the external image URL for the image log generated by execution of the job corresponding to the job log from the log recording unit 11 of the server 1 that responds to the job log transmitted from the log transmitting unit 21. The log transmitting unit 21 adds the received external image URL to the job log recorded in the storage unit 22. The log transmitting unit 21 receives the external image URL from the server 1, and then executes a transmission initiation permission request for the image log to the server 1. The log transmitting unit 21 receives the transmission initiation command for the image log from the server 1 in response to the transmission initiation permission request for the image log. The log transmitting unit 21 initiates transmitting of the image log to the server 1 according to the transmission initiation command for the image log.

The management terminal 3 executes a monitoring process on the image log. The monitoring process for example is a process that searches for an image log (the recorded position of an image log) by use of the job attribute information as a search key. The monitoring process may include a process of preview display of image logs that have been identified by a search. For this purpose, the management terminal 3 includes a Web browser 31. More specifically, the management terminal 3 executes a search request for the image log on the log search unit 15 of the server 1. The search request includes the job attribute information as a search key. The management terminal 3 receives the search result from the log search unit 15 that has executed the search.

FIG. 2 illustrates an example of log information recorded in the storage unit provided in the server. The log information illustrated in FIG. 2 includes a job log and an image log. The job log includes the job log attribution, the device image URL, and the external image URL. The image log is binary data for the image obtained when the device 2 executes an image processing operation such as reading, or the like. The storage format for the image log may be a format of direct storage by the log recording unit 11 in the log information 14, or may be a format in which a region other than the log information 14 is designated and conserved, and the log information 14 includes only pointer information to that other region.

Figure 3:
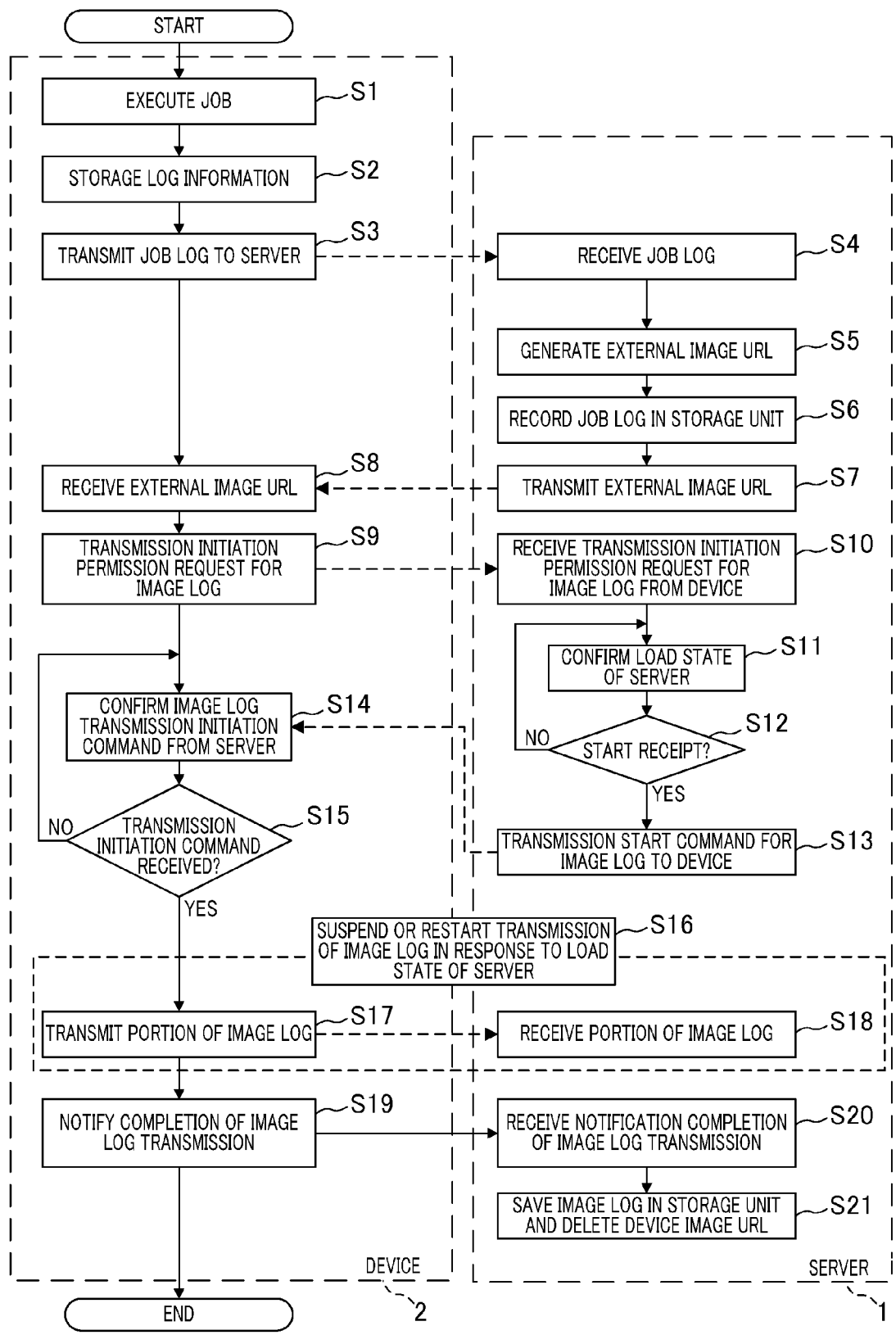
FIG. 3 illustrates an example of the flow of the recording process for log information.
Figure 4:
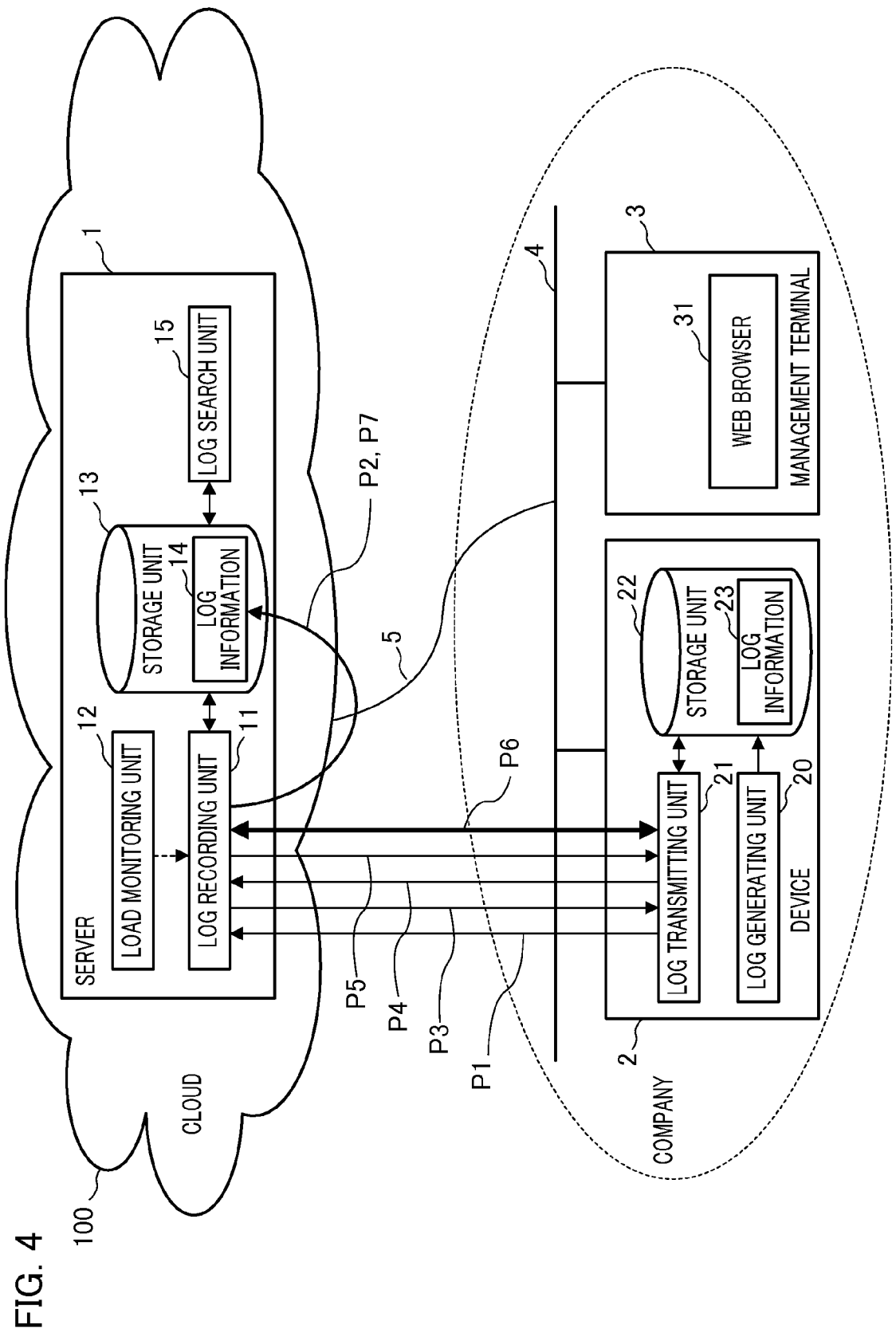
FIG. 4 describes the recording process for log information.

The recording process for log information in the present embodiment will be described below making reference to FIGS. 3 and 4. FIG. 3 illustrates an example of the flow of the recording process for log information. FIG. 4 describes the recording process for log information. Firstly, in step S1 in FIG. 3, a job related to the reading process of the document is executed by the log generating unit 20 in the device 2 (step S1). The log generating unit 20 stores log information 23 corresponding to the executed job in the storage unit 22 (step S2). The log information 23 includes a job log including the job attribute information and the device image URL, and an image log for the image formed by execution of the job. Next, the log transmitting unit 21 transmits the job log to the server 1 after confirming the communication session (connection) with the server 1 (step S3, P1 in FIG. 4). The communication between the device 2 and the server 1 for the processing after the processing step in step S3 is executed using the communication session confirmed in step S3 without further modification.

The log recording unit 11 for the server 1 receives a job log transmitted from the log transmitting unit 21 of the device 2 (step S4). The log recording unit 11 generates an external image URL for the image log generated by execution of the job corresponding to the job log (step S5). Then the log recording unit 11 generates a new job log by addition of the external image URL generated in the job log received in step S4, and records the log in the storage unit 13 (step S6, P2 in FIG. 4).

Next, the log recording unit 11 transmits the external image URL to the device 2 (step S7, P3 in FIG. 4). The log transmitting unit 21 of the device 2 receives the external image URL from the log recording unit 11 of the server 1 (step S8). The log transmitting unit 21 executes a transmission initiation permission request for the image log to the log recording unit 11 of the server 1 (step S9, P4 in FIG. 4).

The log recording unit 11 of the server 1 receives the transmission initiation permission request for the image log from the device 2 (step S10). Then, the load monitoring unit 12 confirms the load state of the server 1 (step S11). The load state of the server 1 is the usage rate or the like of the central processing unit (CPU) provided in the server 1. The load monitoring unit 12 determines whether receipt of the image log by the server 1 has started based on the confirmed load state (step S12). For example, when the value exhibited by the load state (for example, the usage rate of the CPU) is equal to or greater than a predetermined threshold value, the load monitoring unit 12 determines that initiation of receipt of the image log by the server 1 is not possible. The threshold value is pre-set to a level at which receipt of the image log by the server 1 can be started. When the value exhibited by the load state is less than the predetermined threshold value, the load monitoring unit 12 determines than initiation of receipt of the image log by the server 1 can be started.

When the load monitoring unit 12 determines that receipt of the image log by the server 1 cannot be started, the process returns to step S11. When the load monitoring unit 12 determines that receipt of the image log by the server 1 can be started, the load recording unit 11 executes a transmission initiation command for the image log to the device 2 (step S13, P5 in FIG. 4). Next, the log transmitting unit 21 of the device 2 confirms the transmission initiation command for the image log from the log recording unit 11 of the server 1 (step S14, and determines whether the transmission initiation command for the image log has been received (step S15). When the log transmitting unit 21 determines that the transmission initiation command for the image log has not been received from the log recording unit 11 of the server 1, the process returns to step S14. When the log transmitting unit 21 determines that the transmission initiation command for the image log has been received from the log record unit 11 of the server 1, the process proceeds to step S16.

In step S16, the server 1 commands suspension or restarting of transmission of the image log to the device 2 in response to the load state of the server (step 16). In this manner, the processing in steps S17 and S18 below are repeated until the transmission process for the image log from the device 2 to the server 1 is completed (P6 in step 4). More specifically, in step S17, the log transmitting unit 21 transmits a portion of the image log to the log recording unit 11 in the server 1 (step S17). The log transmitting unit 21 transmits a portion of the image log addressed to the external image URL received from the server 1 in step S8. The log recording unit 11 of the server 1 can detect based on the external image URL whether the portion of the image log received from the log transmitting unit 21 of the device 2 is a portion of the image log that should be recorded in the storage unit 13.

The log recording unit 11 of the server 1 transmits a portion of the image log transmitted from the log transmitting unit 21 of the device in step S17 (step S18). During the transmission and receipt of the image log in step S17 and step S118, the load monitoring unit 12 of the server 1 monitors the load state of the server 1. When the load state of the server 1 monitored by the load monitoring unit 12 reaches a level at which transmission and receipt of the image log is suspended, the log recording unit 11 of the server 1 commands the log transmitting unit 21 of the device 2 to temporarily suspend the transmission of the image log. The level at which transmission and receipt of the image log is suspended is predetermined. After suspension of the transmission of the image log, when the load state of the server 1 falls at least to a level at which transmission and receipt of the image log can be executed, the log recording unit 11 of the server 1 commands the log transmitting unit 21 of the device 2 to restart the transmission of the image log. The processing in steps S16 to S18 is executed by use of the communication session that was established in step S3.

When the log transmitting unit 21 of the device 2 completes transmission of the image log, the log transmitting unit 21 executes a transmission completion notification for the image log to the log recording unit 11 of the server 1 (step S19). The transmission completion notification notifies the completion of transmission of the image log. The log recording unit 11 of the server 1 receives the transmission completion notification for the image log from the log transmitting unit 21 of the device 2 (step S20). Then the log recording unit 11 stores the image log in the storage unit 13, and deletes the device image URL corresponding to the image log (step S21, P7 in FIG. 4). More specifically, the log recording unit 11 deletes the device image URL corresponding to the image log from the job log stored in the storage unit 13 in step S6, and records the image log and the job log after deletion of the device URL as log information in the storage unit 13. According to the recording processing for log information in the present embodiment that has been described with reference to FIGS. 3 and 4, even when transmission of the log from the device 2 to the server 1 becomes concentrated, the log information can be recorded without causing a reduction in the processing performance of the server 1. Furthermore, during the recording processing for log information in the present embodiment, the server 1 records the recorded position information for the image log formed by the device 2 together with the search key, and then the device 2 transmits the image log to the server 1 in accordance with commands from the server 1. Therefore, monitoring by the server 1 of the log related to the image formed by the device 2 commences from immediately after execution of the image processing by the device 2.

Figure 5:
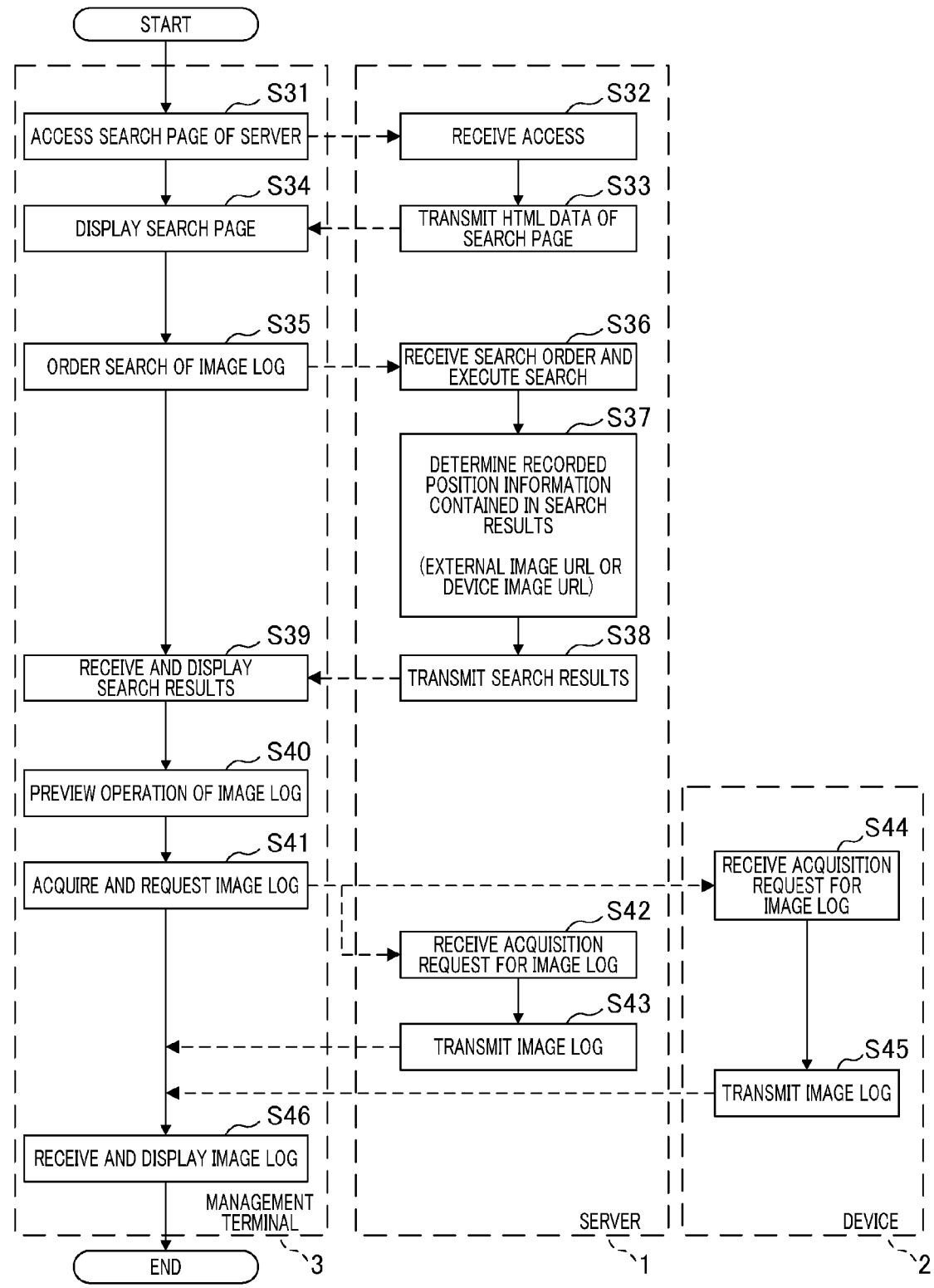
FIG. 5 illustrates an example of the flow of search processing for an image log.
Figure 6:
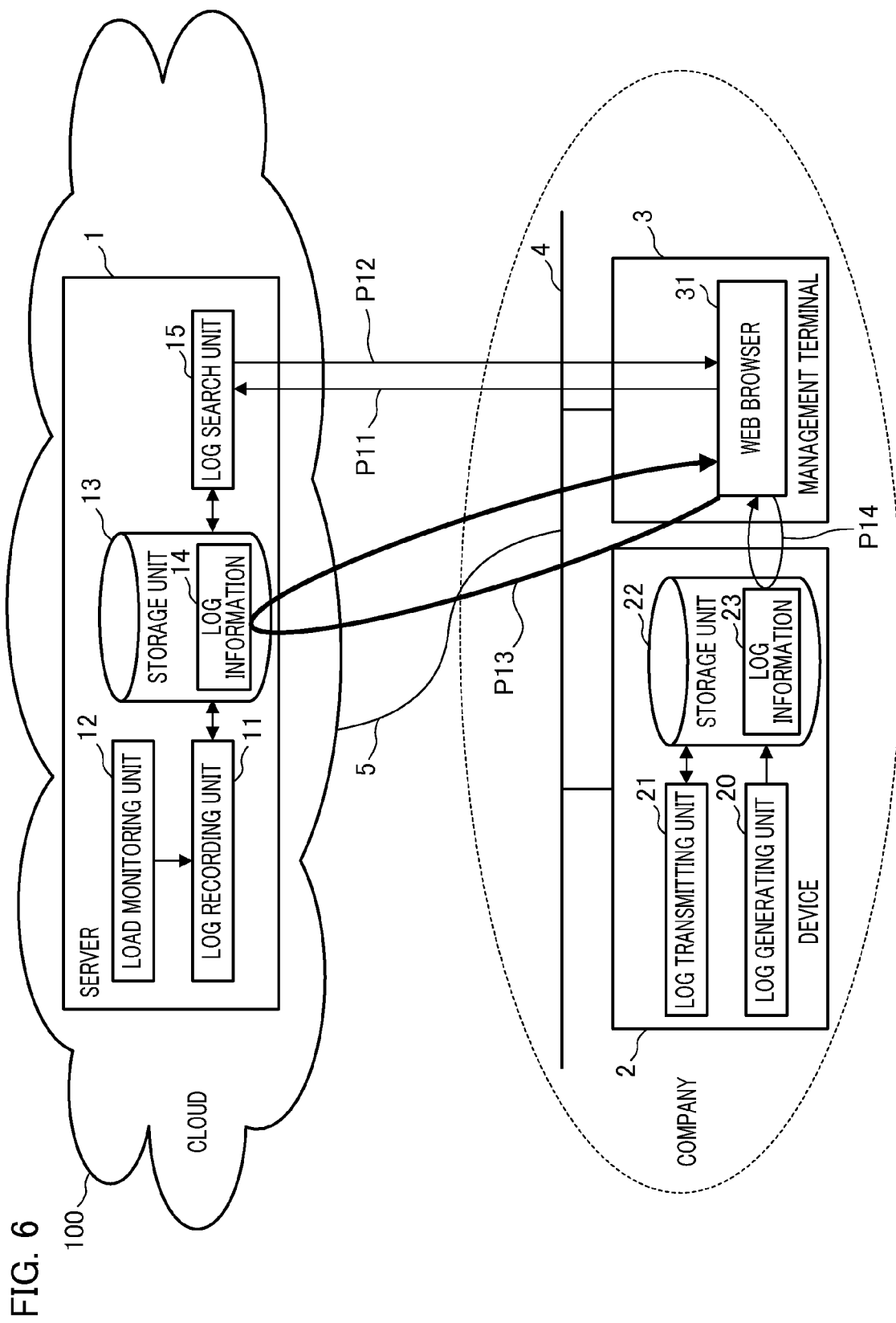
FIG. 6 describes the search processing for an image log.

Next, the search processing of the image log in the present embodiment will be described with reference to FIGS. 5 and 6. FIG. 5 illustrates an example of the flow of search processing for the image log. FIG. 6 describes search processing for the image log. Firstly, in step S31 of FIG. 5, the user (monitoring personnel) of the management terminal 3 uses a Web browser 31 on the management terminal 3 to access the search page managed by the log search unit 15 of the server 1 (step S31, P11 in FIG. 6). The search page is a page that is used in search for the image log. The log search unit 15 of the server 1 receives access from the management terminal 3 (step S32). The log search unit 15 transmits the HTML data for the search page to the Web browser 31 on the management terminal 3 (step S33). HTML is an abbreviation for HyperText Markup Language. The Web browser 31 on the management terminal 3 receives the HTML data of the search page from the log search unit 15 of the server 1, and displays the search page (step S34). The user commands the search conditions including attribute information for the job on the displayed search page, and executes a search initiation operation for the image log. The Web browser 31 transmits the designated search conditions to the log search unit 15 of the server 1 in accordance with the search initiation operation for the image log by the user, and executes an image log search order (step S35).

The log search unit 15 of the server 1 receives the search order for the image log from the Web browser 31 on the management terminal 3. Then the log search unit 15 searches the recorded position information for the image log corresponding to the job attribute information stored in the storage unit 13 based on the job attribute information contained in the designated search conditions (step S36). The log search unit 15 determines the searched external image URL or the device image URL as the recorded position information contained in the search result (step S37). When the server 1 has already received the image log from the device 2, the external image URL for the image log is recorded in the storage unit 13, and the device image URL is not recorded. As described with reference to step S21 in FIG. 3, when the server 1 receives an image log from the device 2, the server 1 deletes the device image URL from the job log. Therefore, when the server 1 has already received the image log from the device 2, the log search unit 15 determines the external image URL as recorded position information contained in the search result.

When the server 1 has not received the image log from the device 2, the device image URL and the external image URL corresponding to the image log are recorded in the storage unit 13. Therefore, when the server 1 has not received the image log from the device 2, the log search unit 15 determines the device image URL as recorded position information contained in the search result. The log search unit 15 transmits the search result to the Web browser 31 on the management terminal 3 (step S38, P12 in FIG. 6).

The Web browser 31 on the management terminal 3 receives and displays the search result from the log search unit 15 of the server 1 (step S39). The user of the management terminal 3 selects the predetermined search result from the displayed search results, and executes a preview operation in relation to the image log corresponding to the selected search result (step S40). The Web browser 31 on the management terminal 3 executes an acquisition request for the image log in accordance with the preview operation for the image log executed in the step S40 (step S41). The acquisition request for the image log in step S41 is executed as described below. When the external image URL is contained in the search results selected in step S40, the Web browser 31 executes an acquisition request for the image log on the log recording unit 11 of the server 1. On the other hand, when the device image URL is contained in the search results selected in step S40, the Web browser 31 executes an acquisition request for the image log on the log recording unit 11 of the device 2.

In the server 1, the log recording unit 11 receives the acquisition request for the image log from the Web browser 31 (step S42). Then the log recording unit 11 extracts the image log corresponding to the acquisition request from the storage unit 13, and transmits the extracted image log to the Web browser on the management terminal 3 (step S43, P13 in FIG. 6), and the process proceeds to step S46. In the device 2, the log transmitting unit 21 receives the acquisition request for the image log from the Web browser 31 (step S44). The log transmitting unit 21 extracts the image log corresponding to the acquisition request from the storage unit 22, and transmits the extracted image log to the Web browser 31 on the management terminal 3 (step S45, P14 in FIG. 6), and the process proceeds to step S46. The Web browser 31 on the management terminal 3 receives and displays the image log transmitted from the server 1 or the device 2 (step S46). In accordance with the search process for the image log described with reference to FIG. 5 and FIG. 6, when the server 1 has already received the image log from the device 2, the management terminal 3 executes an acquisition request for the image log on the server 1. Conversely, when the server 1 has not yet received the image log from the device 2, the management terminal 3 executes an acquisition request for the image log on the device 2. Therefore, in accordance with the search process for the image log according to the present embodiment, the management terminal 3 enables acquisition of the image log even during a period during which the device 2 has not transmitted the image log to the server 1.

According to the information processing apparatus according to the present invention as described above, monitoring by an information processing apparatus of a log related to an image formed by an image process is enabled from immediately after execution of image processing by the image forming apparatus.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g. computer-readable medium).

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2010-116139 filed May 20, 2010, which is hereby incorporated by reference herein in its entirety.

What is claimed is:

1. An information processing apparatus that is connected with an image forming apparatus through a network and is configured to manage log information for a job related to image processing executed by the image forming apparatus, the information processing apparatus comprising:
a memory; and
a processor in communication with the memory, the processor configured to control:
a first receiver configured to receive, from the image forming apparatus that has formed an image by execution of the job, a first log including attribution information for the job and second recorded location information that is recorded location information for a second log related to the image formed in the image forming apparatus;
a generation unit configured to generate first recorded location information that is recorded location information in the information processing apparatus for the second log;
a log recording unit configured to record, in a predetermined storage unit, information including the first log and the first recorded location information as a third log, and to record log information including the second log and the third log;
a command transmitter configured to transmit a transmission initiation command for the second log to the image forming apparatus, after the third log is recorded by the log recording unit; and
a second receiver configured to receive the second log from the image forming apparatus according to the transmission initiation command.

2. The information processing apparatus according to claim 1, wherein the image forming apparatus is disposed in a local area configured with limited external access, and the command transmitter transmits the transmission initiation command for the second log in relation to the image forming apparatus by responding to a transmission initiation permission request for the second log executed by the image forming apparatus on the information processing apparatus.

3. The information processing apparatus according to claim 1,
wherein the processor is further configured to control: a load monitoring unit configured to monitor a load state of the information processing apparatus, and
wherein the command transmitter commands a suspension or a restart of transmission of the second log to the image forming apparatus in response to the load state of the information processing apparatus monitored by the load monitoring unit.

4. The information processing apparatus according to claim 1, wherein the processor is further configured to control: a log search unit configured to receive a search request for the second log from an external apparatus and to search for the first recorded location information and the second recorded location information corresponding to the second log recorded in the storage unit based on the attribute information for the job contained in the search request.

5. The information processing apparatus according to claim 1, wherein the log recording unit deletes the second location information from the third log upon receipt of the second log from the image forming apparatus, and records information including the second log and the third log after deletion of the second recorded location information as log information in the predetermined storage unit.

6. An image forming apparatus that is connected with an information processing apparatus configured to manage log information through a network, the image forming apparatus comprising:
a memory; and
a processor in communication with the memory, the processor configured to control:
an execution unit configured to execute a job related to image processing;
a log generating unit configured to generate attribute information for the job executed by the execution unit and a second log related to an image formed by execution of the job; and
a log transmitter configured to transmit, to the information processing apparatus, a first log including the attribute information generated by the log generating unit and second recorded location information that is recorded location information for the second log related to the image formed by the execution of the job in the image forming apparatus,
wherein the log transmitter transmits the second log to the information processing apparatus in accordance with a transmission initiation command for the second log that is received from the information processing apparatus after the first log is transmitted by the log transmitter.

7. A control method for an information processing apparatus that is connected with an image forming apparatus through a network and that is configured to manage log information for a job related to image processing executed by the image forming apparatus, the control method comprising steps of:

receiving, from the image forming apparatus that has formed an image by execution of the job, a first log including attribution information for the job and second recorded location information that is recorded location information for a second log related to the image formed in the image forming apparatus;

generating first recorded location information that is the recorded location information in the information processing apparatus for the second log;

recording, in a predetermined storage unit, information including the first log and the first recorded location information as a third log, and recording log information including the second log and the third log;

transmitting a transmission initiation command for the second log to the image forming apparatus, after the third log is recorded in the recording step; and receiving the second log from the image forming apparatus according to the transmission initiation command.

8. A non-transitory computer-readable storage medium storing a computer program that when executed causes a computer to perform a control method of an information processing apparatus that is connected with an image forming apparatus through a network and that is configured to manage log information for a job related to image processing executed by the image forming apparatus, wherein the control method includes:

receiving, from the image forming apparatus that has formed an image by execution of the job, a first log including attribution information for the job and second recorded location information that is recorded location information for a second log related to the image formed in the image forming apparatus;

generating first recorded location information that is the recorded location information in the information processing apparatus for the second log;

recording, in a predetermined storage unit, information including the first log and the first recorded location information as a third log, and recording log information including the second log and the third log;

transmitting a transmission initiation command for the second log to the image forming apparatus, after the third log is recorded;

receiving second log from the image forming apparatus according to the transmission initiation command.

9. The information processing apparatus according to claim 5:

wherein the processor is configured to control a log search unit configured to receive a search request for the second log from an external apparatus and to search for the first recorded location information and the second recorded location information corresponding to the second log recorded in the storage unit based on the attribute information for the job contained in the search request, and wherein the log search unit determines whether the second recorded location information corresponding to the attribute information for the job contained in the search request is recorded in the storage unit, and, when the second recorded location information corresponding to the attribute information for the job is recorded, the log search unit transfers the second recorded location information to the external apparatus.

* * * * *